United States Patent
Iyer et al.

(10) Patent No.: US 12,399,875 B2
(45) Date of Patent: Aug. 26, 2025

(54) EFFICIENT DEDUPLICATION OF RANDOMIZED FILE PATHS

(71) Applicant: Snowflake Inc., Bozeman, MT (US)

(72) Inventors: Ganeshan Ramachandran Iyer, Redmond, WA (US); Raghav Ramachandran, Seattle, WA (US); Subramanian Muralidhar, Mercer Island, WA (US)

(73) Assignee: SNOWFLAKE INC., Bozeman, MT (US)

( * ) Notice: Subject to any disclaimer, the term of this patent is extended or adjusted under 35 U.S.C. 154(b) by 0 days.

(21) Appl. No.: 18/513,163

(22) Filed: Nov. 17, 2023

(65) Prior Publication Data

US 2024/0086381 A1 Mar. 14, 2024

Related U.S. Application Data

(63) Continuation of application No. 17/971,482, filed on Oct. 21, 2022, now Pat. No. 11,853,274, which is a continuation of application No. 17/709,234, filed on Mar. 30, 2022, now Pat. No. 11,494,352.

(51) Int. Cl.
| | |
|---|---|
| G06F 16/00 | (2019.01) |
| G06F 16/215 | (2019.01) |
| G06F 16/2455 | (2019.01) |
| G06F 16/2457 | (2019.01) |
| G06F 16/248 | (2019.01) |

(52) U.S. Cl.
CPC ...... *G06F 16/215* (2019.01); *G06F 16/24552* (2019.01); *G06F 16/24573* (2019.01); *G06F 16/248* (2019.01)

(58) Field of Classification Search
None
See application file for complete search history.

(56) References Cited

U.S. PATENT DOCUMENTS

| | | | |
|---|---|---|---|
| 8,977,626 B2 * | 3/2015 | Hess | G06F 16/335 707/754 |
| 2014/0188805 A1 | 7/2014 | Vijayan | |
| 2020/0065306 A1 | 2/2020 | Manville et al. | |
| 2021/0349866 A1 | 11/2021 | Kim et al. | |

* cited by examiner

*Primary Examiner* — Bai D Vu
(74) *Attorney, Agent, or Firm* — WOMBLE BOND DICKINSON (US) LLP

(57) ABSTRACT

Techniques for deduplicating files to be ingested by a database are disclosed. A bloom filter may be built for each of a first set of files to be ingested into a data exchange to generate a set of bloom filters, wherein each of the set of bloom filters is built with a number of hash functions that is based on a desired false positive rate. The set of bloom filters may be stored in the metadata storage of the data exchange. In response to receiving a set of candidate files to be ingested, identifying using the set of bloom filters, candidate files from the set of candidate files that are duplicative of a file in the first set of files and pruning from the set of candidate files, each candidate file identified as being duplicative of a file in the first set of files using the set of bloom filters.

21 Claims, 11 Drawing Sheets

{X, Y, Z} (K (3) DIFFERENT HASH FUNCTIONS)

(M-BIT ARRAY)

*FIG. 5A*

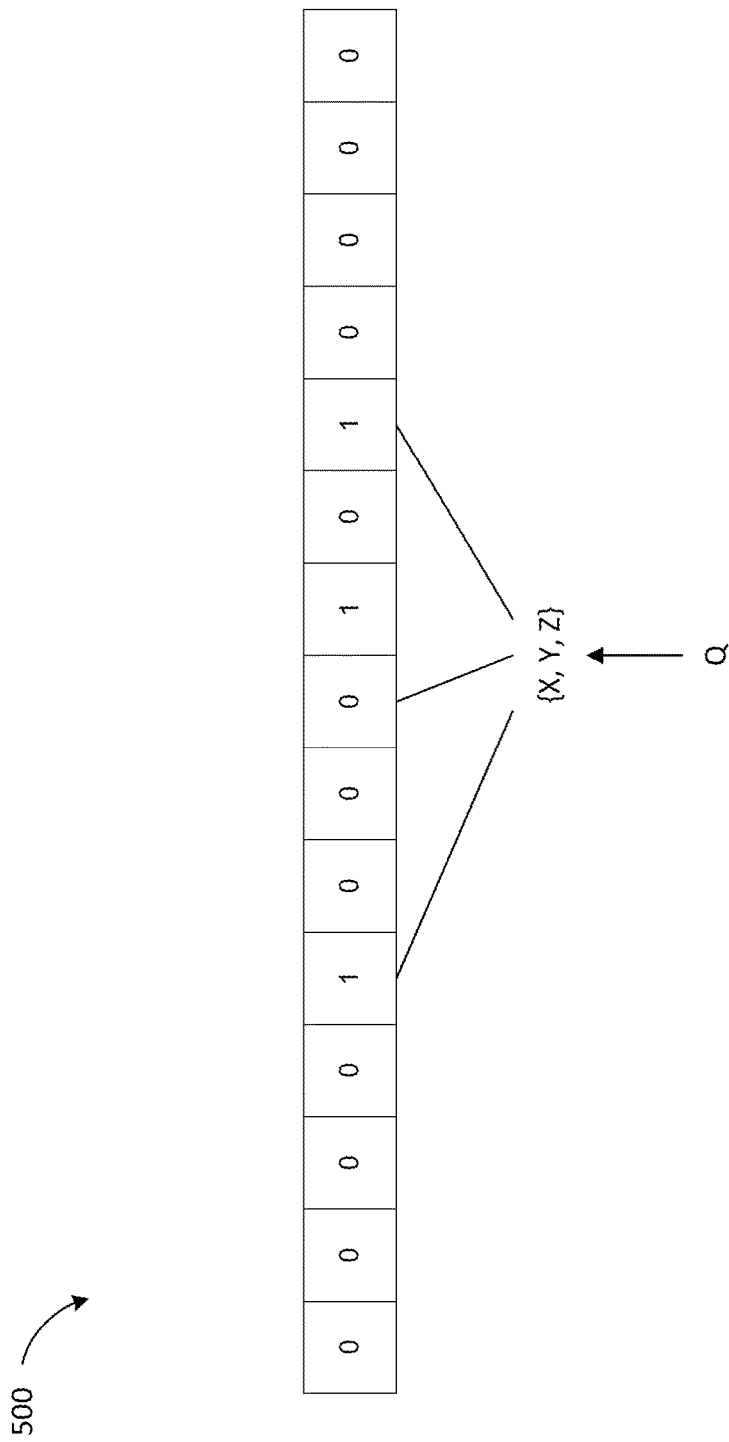

EFFICIENT DEDUPLICATION OF RANDOMIZED FILE PATHS

CROSS REFERENCE TO RELATED APPLICATIONS

This application is a continuation of co-pending U.S. application Ser. No. 17/971,482, filed on Oct. 21, 2022 and entitled "EFFICIENT DEDUPLICATION OF RANDOMIZED FILE PATHS," which is a continuation of U.S. application Ser. No. 17/709,234, filed on Mar. 30, 2022, now issued as U.S. Pat. No. 11,494,352, and entitled "EFFICIENT DEDUPLICATION OF RANDOMIZED FILE PATHS," the disclosures of which are hereby incorporated by reference.

TECHNICAL FIELD

The present disclosure relates to data sharing platforms, and particularly to deduplication of data being ingested into a data sharing platform.

BACKGROUND

Databases are widely used for data storage and access in computing applications. Databases may include one or more tables that include or reference data that can be read, modified, or deleted using queries. Databases may be used for storing and/or accessing personal information or other sensitive information. Secure storage and access of database data may be provided by encrypting and/or storing data in an encrypted form to prevent unauthorized access. In some cases, data sharing may be desirable to let other parties perform queries against a set of data.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIGS. 5A-5C illustrate the creation of a bloom filter for an ingested file and use of the bloom filter to determine if a file to be ingested may be duplicative of the ingested file, in accordance with some embodiments of the present invention.

DETAILED DESCRIPTION

Figure 1A:
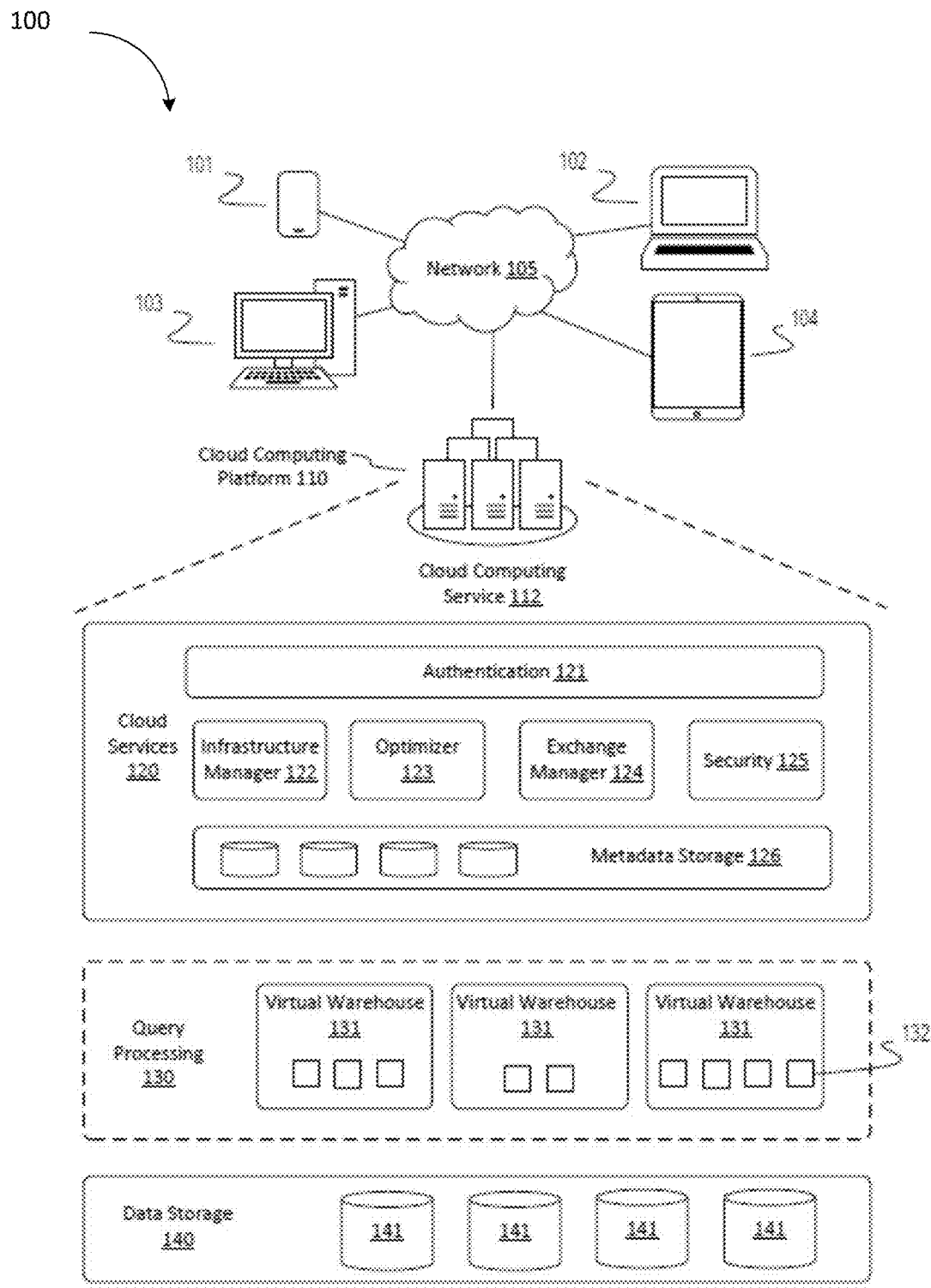
FIG. 1A is a block diagram depicting an example computing environment in which the methods disclosed herein may be implemented, in accordance with some embodiments of the present invention.

Data providers often have data assets that are cumbersome to share, but of interest to another entity. For example, a large online retail company may have a data set that includes the purchasing habits of millions of consumers over the last ten years. If the online retailer wishes to share all or a portion of this data with another entity, the online retailer may need to use old and slow methods to transfer the data, such as a file-transfer-protocol (FTP), or even copying the data onto physical media and mailing the physical media to the other entity. This has several disadvantages. First, it is slow as copying terabytes or petabytes of data can take days. Second, once the data is delivered, the provider cannot control what happens to the data. The recipient can alter the data, make copies, or share it with other parties. Third, the only entities that would be interested in accessing such a large data set in such a manner are large corporations that can afford the complex logistics of transferring and processing the data as well as the high price of such a cumbersome data transfer. Thus, smaller entities (e.g., "mom and pop" shops) or even smaller, nimbler cloud-focused startups are often priced out of accessing this data, even though the data may be valuable to their businesses. This may be because raw data assets are generally too unpolished and full of potentially sensitive data to simply outright sell/provide to other companies. Data cleaning, de-identification, aggregation, joining, and other forms of data enrichment need to be performed by the owner of data before it is shareable with another party. This is time-consuming and expensive. Finally, it is difficult to share data assets with many entities because traditional data sharing methods do not allow scalable sharing for the reasons mentioned above. Traditional sharing methods also introduce latency and delays in terms of all parties having access to the most recently-updated data.

Private and public data exchanges may allow data providers to more easily and securely share their data assets with other entities. A public data exchange (also referred to herein as a "Snowflake data marketplace," or a "data marketplace") may provide a centralized repository with open access where a data provider may publish and control live and read-only data sets to thousands of consumers. A private data exchange (also referred to herein as a "data exchange") may be under the data provider's brand, and the data provider may control who can gain access to it. The data exchange may be for internal use only, or may also be opened to consumers, partners, suppliers, or others. The data provider may control what data assets are listed as well as control who has access to which sets of data. This allows for a seamless way to discover and share data both within a data provider's organization and with its business partners.

The data exchange may be facilitated by a cloud computing service such as the SNOWFLAKE™ cloud computing service, and allows data providers to offer data assets directly from their own online domain (e.g., website) in a private online marketplace with their own branding. The data exchange may provide a centralized, managed hub for an entity to list internally or externally-shared data assets, inspire data collaboration, and also to maintain data governance and to audit access. With the data exchange, data providers may be able to share data without copying it between companies. Data providers may invite other entities to view their data listings, control which data listings appear in their private online marketplace, control who can access data listings and how others can interact with the data assets connected to the listings. This may be thought of as a "walled garden" marketplace, in which visitors to the garden must be approved and access to certain listings may be limited.

As an example, Company A has collected and analyzed the consumption habits of millions of individuals in several different categories. Their data sets may include data in the following categories: online shopping, video streaming, electricity consumption, automobile usage, internet usage, clothing purchases, mobile application purchases, club memberships, and online subscription services. Company A may desire to offer these data sets (or subsets or derived products of these data sets) to other entities, thus becoming a Data Supplier or Data Provider. For example, a new clothing brand may wish to access data sets related to consumer clothing purchases and online shopping habits. Company A may support a page on its website that is or functions substantially similar to a data exchange, where a data consumer (e.g., the new clothing brand) may browse, explore, discover, access and potentially purchase data sets directly from Company A. Further, Company A may control: who can enter the data exchange, the entities that may view a particular listing, the actions that an entity may take with respect to a listing (e.g., view only), and any other suitable action. In addition, a data provider may combine its own data with other data sets from, e.g., a public data exchange (also referred to as a "data marketplace"), and create new listings using the combined data.

A data exchange may be an appropriate place to discover, assemble, clean, and enrich data to make it more monetizable. A large company on a data exchange may assemble data from across its divisions and departments, which could become valuable to another company. In addition, participants in a private ecosystem data exchange may work together to join their datasets together to jointly create a useful data product that any one of them alone would not be able to produce. Once these joined datasets are created, they may be listed on the data exchange or on the data marketplace.

Sharing data may be performed when a data provider creates a share object (hereinafter referred to as a share) of a database in the data provider's account and grants the share access to particular objects (e.g., tables, secure views, and secure user-defined functions (UDFs)) of the database. Then, a read-only database may be created using information provided in the share. Access to this database may be controlled by the data provider. A "share" encapsulates all of the information required to share data in a database. A share may include at least three pieces of information: (1) privileges that grant access to the database(s) and the schema containing the objects to share, (2) the privileges that grant access to the specific objects (e.g., tables, secure views, and secure UDFs), and (3) the consumer accounts with which the database and its objects are shared. The consumer accounts with which the database and its objects are shared may be indicated by a list of references to those consumer accounts contained within the share object. Only those consumer accounts that are specifically listed in the share object may be allowed to look up, access, and/or import from this share object. By modifying the list of references of other consumer accounts, the share object can be made accessible to more accounts or be restricted to fewer accounts.

In some embodiments, each share object contains a single role. Grants between this role and objects define what objects are being shared and with what privileges these objects are shared. The role and grants may be similar to any other role and grant system in the implementation of role-based access control. By modifying the set of grants attached to the role in a share object, more objects may be shared (by adding grants to the role), fewer objects may be shared (by revoking grants from the role), or objects may be shared with different privileges (by changing the type of grant, for example to allow write access to a shared table object that was previously read-only). In some embodiments, share objects in a provider account may be imported into the target consumer account using alias objects and cross-account role grants.

When data is shared, no data is copied or transferred between users. Sharing is accomplished through the cloud computing services of a cloud computing service provider such as SNOWFLAKE™. Shared data may then be used to process SQL queries, possibly including joins, aggregations, or other analysis. In some instances, a data provider may define a share such that "secure joins" are permitted to be performed with respect to the shared data. A secure join may be performed such that analysis may be performed with respect to shared data but the actual shared data is not accessible by the data consumer (e.g., recipient of the share).

A data exchange may also implement role-based access control to govern access to objects within consumer accounts using account level roles and grants. In one embodiment, account level roles are special objects in a consumer account that are assigned to users. Grants between these account level roles and database objects define what privileges the account level role has on these objects. For example, a role that has a usage grant on a database can "see" this database when executing the command "show databases"; a role that has a select grant on a table can read from this table but not write to the table. The role would need to have a modify grant on the table to be able to write to it.

One way a customer may ingest data into a data exchange is to upload files into e.g., a cloud storage (such as Amazon S3™) and then import the files into the data exchange. In order to prevent ingestion of duplicate copies of files (i.e., files that are already within the data exchange) and wasting storage space, the data exchange may perform deduplication on files that a user is ingesting into the data exchange. Indeed, many data exchanges provide guarantees on the amount of time the data of an ingested file will not be duplicated in a subsequently ingested file (e.g., 65 days). When ingesting new files, if the data exchange determines that any of the new files contain data that is duplicative of data within files that have already been ingested by the data exchange, it may skip ingestion of that file and may only ingest files that are determined to be new (i.e., not duplicative). There are a number of techniques that data exchanges may utilize in order to deduplicate files. For example, a data exchange may maintain metadata stores where metadata including a list of files ingested is stored. This metadata may include file path information that is used to perform e.g., file path-based minimum/maximum pruning. Such file path information may include various information that may be used to prune files to be ingested. For example, the file path for a file may include year/month/date information indicating a date when the file was ingested and the year/month/date information of newly received files may be used (e.g., compared to year/month/date information from the file paths of already ingested files) to prune newly received files based on whether they are outside or inside specific date ranges etc. as indicated by their file paths.

However, most customers do not have files with well-structured file paths. Instead, customers often have files with unclustered file paths (e.g., 's3://bucket-name/<Random-UUID>.csv') that are essentially random strings, so that the use of minimum/maximum pruning will result in a large number of false matches due to the random distribution of information in the file paths. As a result, the data exchange could end up scanning the entire file load history. Caching generally does not help in these scenarios as the data exchange would have to cache the entire file load history to efficiently deduplicate new files. Thus, deduplication is often inefficient for customers who have unclustered file paths.

The present disclosure addresses the above and other issues by providing techniques for deduplicating files to be ingested by a data exchange. In response to receiving a first set of files to be ingested into the data exchange, a processing device may build a bloom filter for each of the first set of files. The set of bloom filters may be stored in a dedicated slice of a metadata storage of the data exchange. The metadata storage may also include file loading metadata of the first set of files in a separate dedicated slice. In response to subsequently receiving a set of candidate files to be ingested into the data exchange, the processing device may utilize the file loading metadata of the first set of files and the file loading metadata of the set of candidate files to perform standard deduplication techniques (e.g., file path-based minimum/maximum deduplication) and thereby remove one or more of the set of candidate files that are duplicative of a file in the first set of files. This may result in a reduced set of candidate files. The processing device may retrieve and cache each bloom filter from the metadata storage and for each of the reduced set of candidate files, process the candidate file with the bloom filter for each of the first set of files to determine if the candidate file is duplicative of any of the first set of files. Candidate files that are not duplicative are identified and set for ingestion, while candidate files that are potentially duplicative are identified and set for further scanning.

FIG. 1A is a block diagram of an example computing environment 100 in which the systems and methods disclosed herein may be implemented. In particular, a cloud computing platform 110 may be implemented, such as Amazon Web Services™ (AWS), Microsoft Azure™, Google Cloud™, or the like. As known in the art, a cloud computing platform 110 provides computing resources and storage resources that may be acquired (purchased) or leased and configured to execute applications and store data.

The cloud computing platform 110 may host a cloud computing service 112 that facilitates storage of data on the cloud computing platform 110 (e.g. data management and access) and analysis functions (e.g. SQL queries, analysis), as well as other computation capabilities (e.g., secure data sharing between users of the cloud computing platform 110).

The cloud computing platform 110 may include a three-tier architecture: data storage 140, query processing 130, and cloud services 120.

Data storage 140 may facilitate the storing of data on the cloud computing platform 110 in one or more cloud databases 141. Data storage 140 may use a storage service such as Amazon S3™ to store data and query results on the cloud computing platform 110. In particular embodiments, to load data into the cloud computing platform 110, data tables may be horizontally partitioned into large, immutable files which may be analogous to blocks or pages in a traditional database system. Within each file, the values of each attribute or column are grouped together and compressed using a scheme sometimes referred to as hybrid columnar. Each table has a header which, among other metadata, contains the offsets of each column within the file.

In addition to storing table data, data storage 140 facilitates the storage of temp data generated by query operations (e.g., joins), as well as the data contained in large query results. This may allow the system to compute large queries without out-of-memory or out-of-disk errors. Storing query results this way may simplify query processing as it removes the need for server-side cursors found in traditional database systems.

Query processing 130 may handle query execution within elastic clusters of virtual machines, referred to herein as virtual warehouses or data warehouses. Thus, query processing 130 may include one or more virtual warehouses 131, which may also be referred to herein as data warehouses. The virtual warehouses 131 may be one or more virtual machines operating on the cloud computing platform 110. The virtual warehouses 131 may be compute resources that may be created, destroyed, or resized at any point, on demand. This functionality may create an "elastic" virtual warehouse that expands, contracts, or shuts down according to the user's needs. Expanding a virtual warehouse involves generating one or more compute nodes 132 to a virtual warehouse 131. Contracting a virtual warehouse involves removing one or more compute nodes 132 from a virtual warehouse 131. More compute nodes 132 may lead to faster compute times. For example, a data load which takes fifteen hours on a system with four nodes might take only two hours with thirty-two nodes.

Cloud services 120 may be a collection of services that coordinate activities across the cloud computing service 112. These services tie together all of the different components of the cloud computing service 112 in order to process user requests, from login to query dispatch. Cloud services 120 may operate on compute instances provisioned by the cloud computing service 112 from the cloud computing platform 110. Cloud services 120 may include a collection of services that manage virtual warehouses, queries, transactions, data exchanges, and the metadata associated with such services, such as database schemas, access control information, encryption keys, and usage statistics. Cloud services 120 may include, but not be limited to, authentication engine 121, infrastructure manager 122, optimizer 123, exchange manager 124, security engine 125, and metadata storage 126.

Figure 1B:
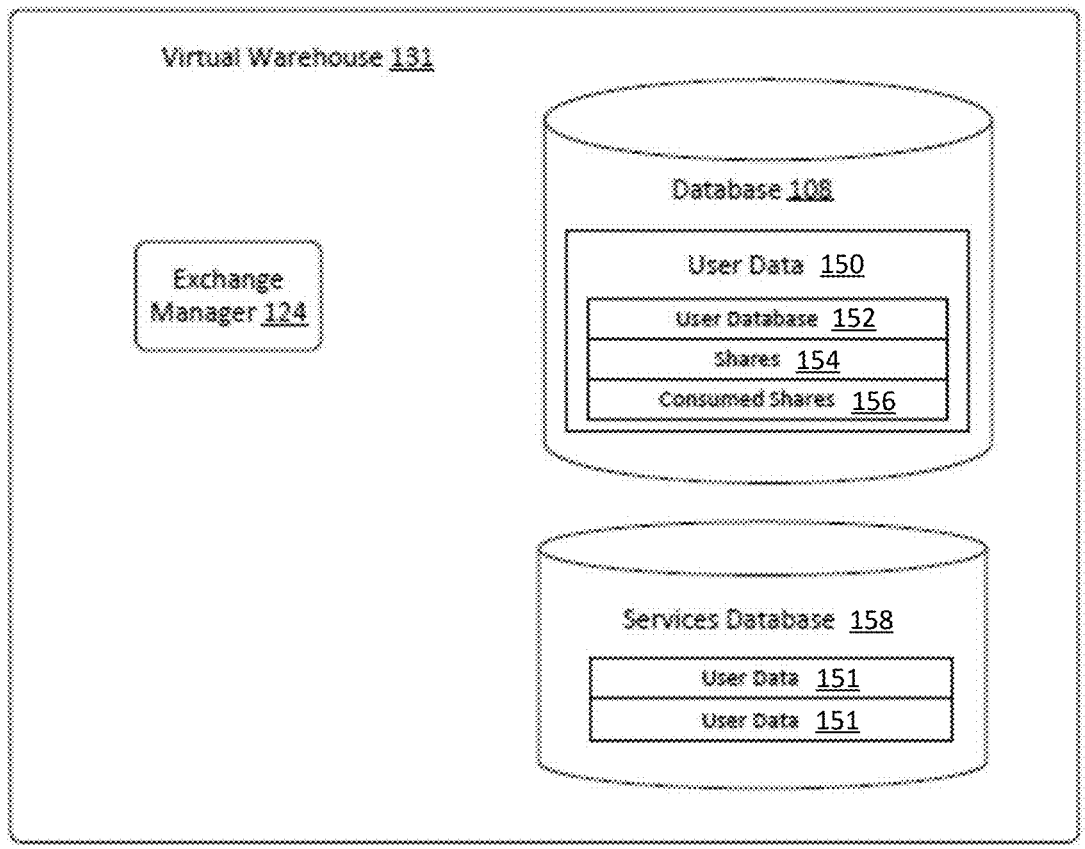
FIG. 1B is a block diagram illustrating an example virtual warehouse, in accordance with some embodiments of the present invention.

FIG. 1B is a block diagram illustrating an example virtual warehouse 131. The exchange manager 124 may facilitate the sharing of data between data providers and data consumers, using, for example, a data exchange. For example, cloud computing service 112 may manage the storage and access of a database 108. The database 108 may include various instances of user data 150 for different users, e.g. different enterprises or individuals. The user data 150 may include a user database 152 of data stored and accessed by that user. The user database 152 may be subject to access controls such that only the owner of the data is allowed to change and access the user database 152 upon authenticating with the cloud computing service 112. For example, data may be encrypted such that it can only be decrypted using decryption information possessed by the owner of the data. Using the exchange manager 124, specific data from a user database 152 that is subject to these access controls may be shared with other users in a controlled manner. In particular, a user may specify shares 154 that may be shared in a public or data exchange in an uncontrolled manner or shared with specific other users in a controlled manner as described above. A "share" encapsulates all of the information required to share data in a database. A share may include at least three pieces of information: (1) privileges that grant access to the database(s) and the schema containing the objects to share, (2) the privileges that grant access to the specific objects (e.g., tables, secure views, and secure UDFs), and (3) the consumer accounts with which the database and its objects are shared. When data is shared, no data is copied or transferred between users. Sharing is accomplished through the cloud services 120 of cloud computing service 112.

Sharing data may be performed when a data provider creates a share of a database in the data provider's account and grants access to particular objects (e.g., tables, secure views, and secure user-defined functions (UDFs)). Then a read-only database may be created using information provided in the share. Access to this database may be controlled by the data provider.

Shared data may then be used to process SQL queries, possibly including joins, aggregations, or other analysis. In some instances, a data provider may define a share such that "secure joins" are permitted to be performed with respect to the shared data. A secure join may be performed such that analysis may be performed with respect to shared data but the actual shared data is not accessible by the data consumer (e.g., recipient of the share). A secure join may be performed as described in U.S. application Ser. No. 16/368,339, filed Mar. 18, 2019.

User devices 101-104, such as laptop computers, desktop computers, mobile phones, tablet computers, cloud-hosted computers, cloud-hosted serverless processes, or other computing processes or devices may be used to access the virtual warehouse 131 or cloud service 120 by way of a network 105, such as the Internet or a private network.

In the description below, actions are ascribed to users, particularly consumers and providers. Such actions shall be understood to be performed with respect to devices 101-104 operated by such users. For example, notification to a user may be understood to be a notification transmitted to devices 101-104, an input or instruction from a user may be understood to be received by way of the user's devices 101-104, and interaction with an interface by a user shall be understood to be interaction with the interface on the user's devices 101-104. In addition, database operations (joining, aggregating, analysis, etc.) ascribed to a user (consumer or provider) shall be understood to include performing of such actions by the cloud computing service 112 in response to an instruction from that user.

Figure 2:
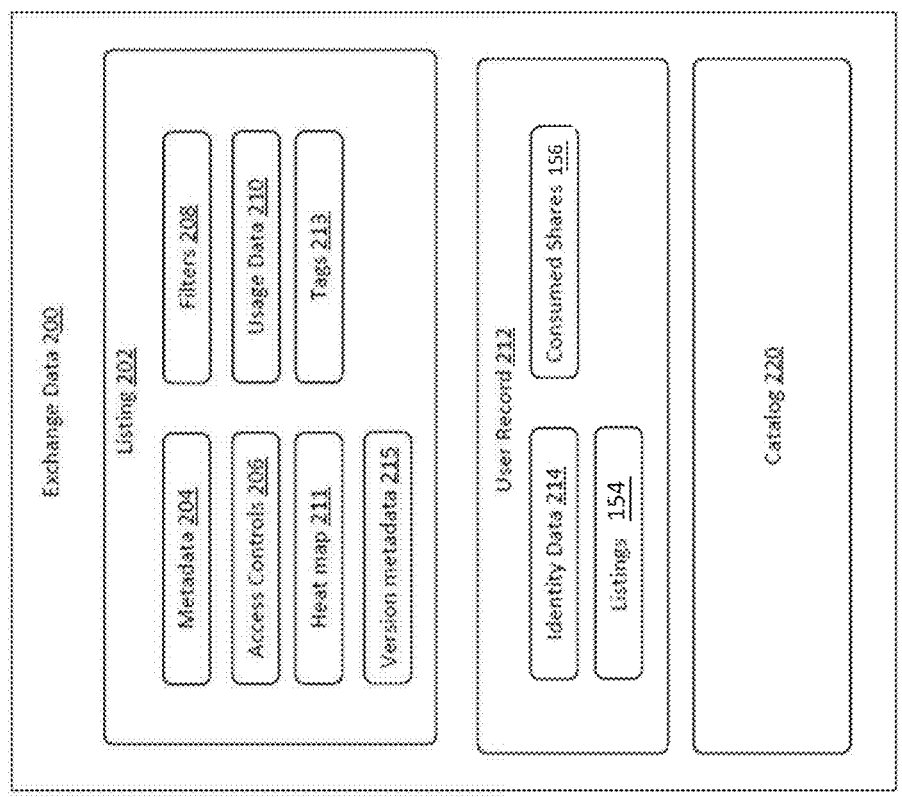
FIG. 2 is a schematic block diagram of data that may be used to implement a public or private data exchange, in accordance with some embodiments of the present invention.

FIG. 2 is a schematic block diagram of data that may be used to implement a public or data exchange in accordance with an embodiment of the present invention. The exchange manager 124 may operate with respect to some or all of the illustrated exchange data 200, which may be stored on the platform executing the exchange manager 124 (e.g., the cloud computing platform 110) or at some other location.

The exchange data 200 may include a plurality of listings 202 describing data that is shared by a first user ("the provider"). The listings 202 may be listings in a data exchange or in a data marketplace. The access controls, management, and governance of the listings may be similar for both a data marketplace and a data exchange.

The listing 202 may include access controls 206, which may be configurable to any suitable access configuration. For example, access controls 206 may indicate that the shared data is available to any member of the private exchange without restriction (an "any share" as used elsewhere herein). The access controls 206 may specify a class of users (members of a particular group or organization) that are allowed to access the data and/or see the listing. The access controls 206 may specify that a "point-to-point" share in which users may request access but are only allowed access upon approval of the provider. The access controls 206 may specify a set of user identifiers of users that are excluded from being able to access the data referenced by the listing 202.

Figure 6:
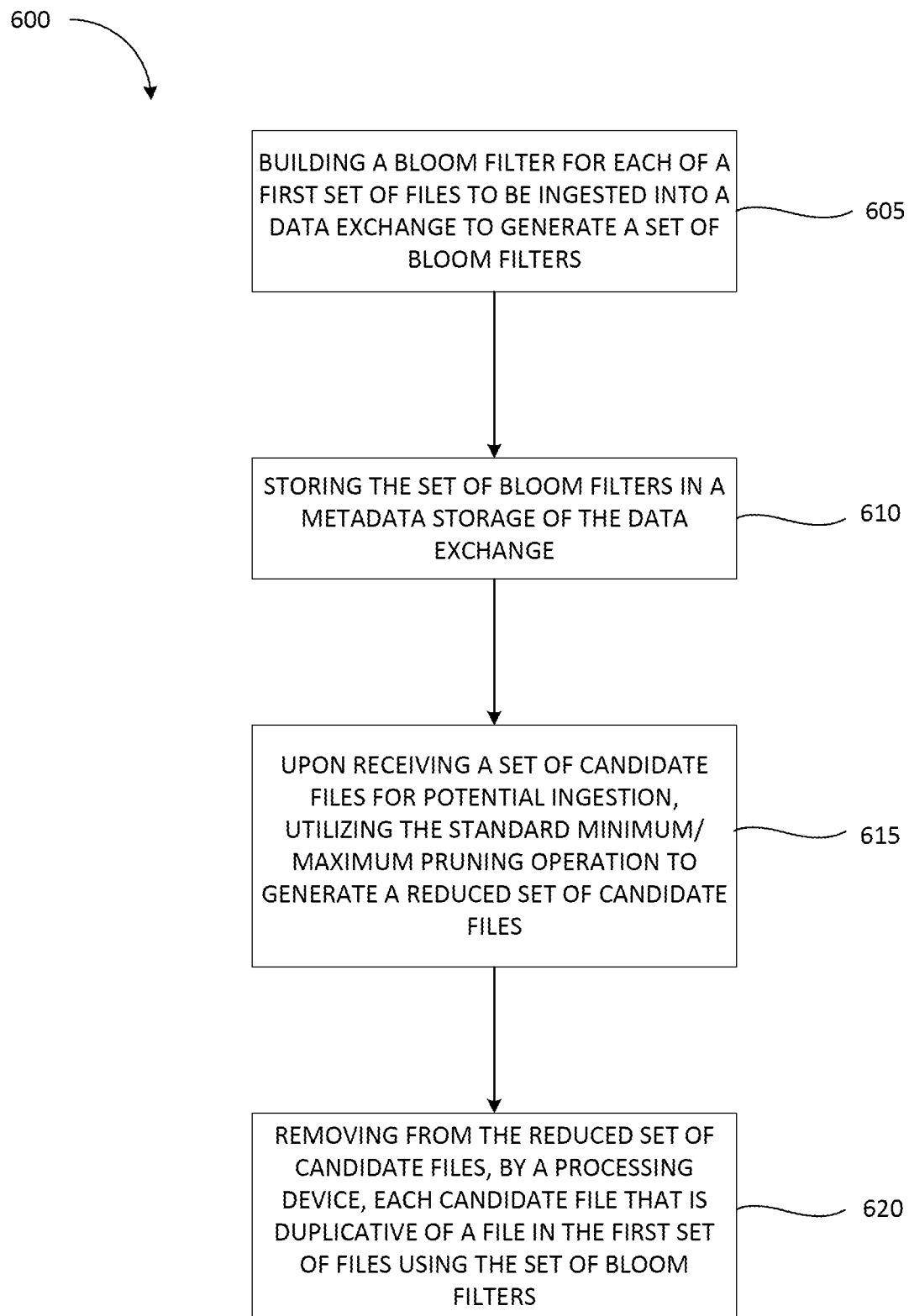
FIG. 6 is a flow diagram of a method for deduplicating files to be ingested by a data exchange, in accordance with some embodiments of the present invention.

Note that some listings 202 may be discoverable by users without further authentication or access permissions whereas actual accesses are only permitted after a subsequent authentication step (see discussion of FIGS. 4 and 6). The access controls 206 may specify that a listing 202 is only discoverable by specific users or classes of users.

Note also that a default function for listings 202 is that the data referenced by the share is not exportable by the consumer. Alternatively, the access controls 206 may specify that this is not permitted. For example, access controls 206 may specify that secure operations (secure joins and secure functions as discussed below) may be performed with respect to the shared data such that viewing and exporting of the shared data is not permitted.

In some embodiments, once a user is authenticated with respect to a listing 202, a reference to that user (e.g., user identifier of the user's account with the virtual warehouse 131) is added to the access controls 206 such that the user will subsequently be able to access the data referenced by the listing 202 without further authentication.

The listing 202 may define one or more filters 208. For example, the filters 208 may define specific identity data 214 (also referred to herein as user identifiers) of users that may view references to the listing 202 when browsing the catalog 220. The filters 208 may define a class of users (users of a certain profession, users associated with a particular company or organization, users within a particular geographical area or country) that may view references to the listing 202 when browsing the catalog 220. In this manner, a private exchange may be implemented by the exchange manager 124 using the same components. In some embodiments, an excluded user that is excluded from accessing a listing 202, i.e. adding the listing 202 to the consumed shares 156 of the excluded user, may still be permitted to view a representation of the listing when browsing the catalog 220 and may further be permitted to request access to the listing 202 as discussed below. Requests to access a listing by such excluded users and other users may be listed in an interface presented to the provider of the listing 202. The provider of the listing 202 may then view demand for access to the listing and choose to expand the filters 208 to permit access to excluded users or classes of excluded users (e.g., users in excluded geographic regions or countries).

Filters 208 may further define what data may be viewed by a user. In particular, filters 208 may indicate that a user that selects a listing 202 to add to the consumed shares 156 of the user is permitted to access the data referenced by the listing but only a filtered version that only includes data associated with the identifier 214 of that user, associated with that user's organization, or specific to some other classification of the user. In some embodiments, a private exchange is by invitation: users invited by a provider to view listings 202 of a private exchange are enabled to do by the exchange manager 124 upon communicating acceptance of an invitation received from the provider.

In some embodiments, a listing 202 may be addressed to a single user. Accordingly, a reference to the listing 202 may be added to a set of "pending shares" that is viewable by the user. The listing 202 may then be added to a group of shares of the user upon the user communicating approval to the exchange manager 124.

The listing 202 may further include usage data 210. For example, the cloud computing service 112 may implement a credit system in which credits are purchased by a user and are consumed each time a user runs a query, stores data, or uses other services implemented by the cloud computing service 112. Accordingly, usage data 210 may record an amount of credits consumed by accessing the shared data. Usage data 210 may include other data such as a number of queries, a number of aggregations of each type of a plurality of types performed against the shared data, or other usage statistics. In some embodiments, usage data for a listing 202 or multiple listings 202 of a user is provided to the user in the form of a shared database, i.e. a reference to a database including the usage data is added by the exchange manager 124 to the consumed shares 156 of the user.

The listing 202 may also include a heat map 211, which may represent the geographical locations in which users have clicked on that particular listing. The cloud computing service 112 may use the heat map to make replication decisions or other decisions with the listing. For example, a data exchange may display a listing that contains weather data for Georgia, USA. The heat map 211 may indicate that many users in California are selecting the listing to learn more about the weather in Georgia. In view of this information, the cloud computing service 112 may replicate the listing and make it available in a database whose servers are physically located in the western United States, so that consumers in California may have access to the data. In some embodiments, an entity may store its data on servers located in the western United States. A particular listing may be very popular to consumers. The cloud computing service 112 may replicate that data and store it in servers located in the eastern United States, so that consumers in the Midwest and on the East Coast may also have access to that data.

The listing 202 may also include one or more tags 213. The tags 213 may facilitate simpler sharing of data contained in one or more listings. As an example, a large company may have a human resources (HR) listing containing HR data for its internal employees on a data exchange. The HR data may contain ten types of HR data (e.g., employee number, selected health insurance, current retirement plan, job title, etc.). The HR listing may be accessible to 100 people in the company (e.g., everyone in the HR department). Management of the HR department may wish to add an eleventh type of HR data (e.g., an employee stock option plan). Instead of manually adding this to the HR listing and granting each of the 100 people access to this new data, management may simply apply an HR tag to the new data set and that can be used to categorize the data as HR data, list it along with the HR listing, and grant access to the 100 people to view the new data set.

The listing 202 may also include version metadata 215. Version metadata 215 may provide a way to track how the datasets are changed. This may assist in ensuring that the data that is being viewed by one entity is not changed prematurely. For example, if a company has an original data set and then releases an updated version of that data set, the updates could interfere with another user's processing of that data set, because the update could have different formatting, new columns, and other changes that may be incompatible with the current processing mechanism of the recipient user. To remedy this, the cloud computing service 112 may track version updates using version metadata 215. The cloud computing service 112 may ensure that each data consumer accesses the same version of the data until they accept an updated version that will not interfere with current processing of the data set.

The exchange data 200 may further include user records 212. The user record 212 may include data identifying the user associated with the user record 212, e.g. an identifier (e.g., warehouse identifier) of a user having user data 151 in service database 158 and managed by the virtual warehouse 131.

The user record 212 may list shares associated with the user, e.g., reference listings 154 created by the user. The user record 212 may list shares consumed by the user, e.g. reference listings 202 created by another user and that have been associated to the account of the user according to the methods described herein. For example, a listing 202 may have an identifier that will be used to reference it in the shares or consumed shares 156 of a user record 212.

The listing 202 may also include metadata 204 describing the shared data. The metadata 204 may include some or all of the following information: an identifier of the provider of the shared data, a URL associated with the provider, a name of the share, a name of tables, a category to which the shared data belongs, an update frequency of the shared data, a catalog of the tables, a number of columns and a number of rows in each table, as well as name for the columns. The metadata 204 may also include examples to aid a user in using the data. Such examples may include sample tables that include a sample of rows and columns of an example table, example queries that may be run against the tables, example views of an example table, example visualizations (e.g., graphs, dashboards) based on a table's data. Other information included in the metadata 204 may be metadata for use by business intelligence tools, text description of data contained in the table, keywords associated with the table to facilitate searching, a link (e.g., URL) to documentation related to the shared data, and a refresh interval indicating how frequently the shared data is updated along with the date the data was last updated.

The metadata 204 may further include category information indicating a type of the data/service (e.g., location, weather), industry information indicating who uses the data/service (e.g., retail, life sciences), and use case information that indicates how the data/service is used (e.g., supply chain optimization, or risk analysis). For instance, retail consumers may use weather data for supply chain optimization. A use case may refer to a problem that a consumer is solving (i.e., an objective of the consumer) such as supply chain optimization. A use case may be specific to a particular industry, or can apply to multiple industries. Any given data listing (i.e., dataset) can help solve one or more use cases, and hence may be applicable to multiple use cases.

Because use case information relates to how data is used, it can be a powerful tool for organizing/searching for data listings as it allows consumers of the data marketplace to explore and find datasets and services based on industry problems they're trying to solve (e.g., supply chain optimization, audience segmentation). However, providers often describe use cases for data listings in an unstructured format, making it hard for consumers to find them. Because there is no standardized representation for such use case information, it is difficult to create data listing filters based on use case information.

Embodiments of the present disclosure solve the above and other problems by enabling providers to assign use case data to data listings in a structured manner, thereby allowing for data listings to be organized and searched/filtered based on use case information in a more effective manner. A processing device may be used to assign to a first data listing, a set of use cases from a plurality of use cases, each of the set of use cases indicating a manner in which data of the first data listing is used. In order to perform this assigning, the processing device may provide a listing creation interface having selectable indications of each of the plurality of use cases and may receive, via the listing creation interface, a selection of the set of use cases assigned to the first data listing (e.g., from the consumer). The first data listing may be published on the data exchange, wherein the first data listing is one of a plurality of data listings published on the data exchange and the processing device may provide a data listing interface comprising a graphical representation of each of the plurality of data listings; and an interactable menu including a selectable indication of each of the plurality of use cases. In response to receiving a selection of one or more of the plurality of use cases via the interactable menu, the processing device may display in the data listing interface, a graphical representation of each of the plurality of data listings that have been assigned any of the selected one or more use cases. The embodiments described herein make it easy for consumers to browse the data exchange based on their business needs in order to find listings that solve those needs. Embodiments of the present disclosure also enable a data exchange operator to learn about consumers' business needs based on their browsing patterns and querying activities (individual and collective), and further personalize their overall data exchange experience (listing recommendations on worksheets, etc.). It should be noted that a "business need" and a "use case" are used interchangeably herein.

The exchange data 200 may further include a catalog 220. The catalog 220 may include a listing of all available listings 202 and may include an index of data from the metadata 204 to facilitate browsing and searching according to the methods described herein. In some embodiments, listings 202 are stored in the catalog in the form of JavaScript Object Notation (JSON) objects.

Note that where there are multiple instances of the virtual warehouse 131 on different cloud computing platforms, the catalog 220 of one instance of the virtual warehouse 131 may store listings or references to listings from other instances on one or more other cloud computing platforms 110. Accordingly, each listing 202 may be globally unique (e.g., be assigned a globally unique identifier across all of the instances of the virtual warehouse 131). For example, the instances of the virtual warehouses 131 may synchronize their copies of the catalog 220 such that each copy indicates the listings 202 available from all instances of the virtual warehouse 131. In some instances, a provider of a listing 202 may specify that it is to be available on only specified one or more computing platforms 110.

In some embodiments, the catalog 220 is made available on the Internet such that it is searchable by a search engine such as the Bing search engine or the Google search engine. The catalog may be subject to a search engine optimization (SEO) algorithm to promote its visibility. Potential consumers may therefore browse the catalog 220 from any web browser. The exchange manager 124 may expose uniform resource locators (URLs) linked to each listing 202. This URL may be searchable and can be shared outside of any interface implemented by the exchange manager 124. For example, the provider of a listing 202 may publish the URLs for its listings 202 in order to promote usage of its listing 202 and its brand.

Figure 3:
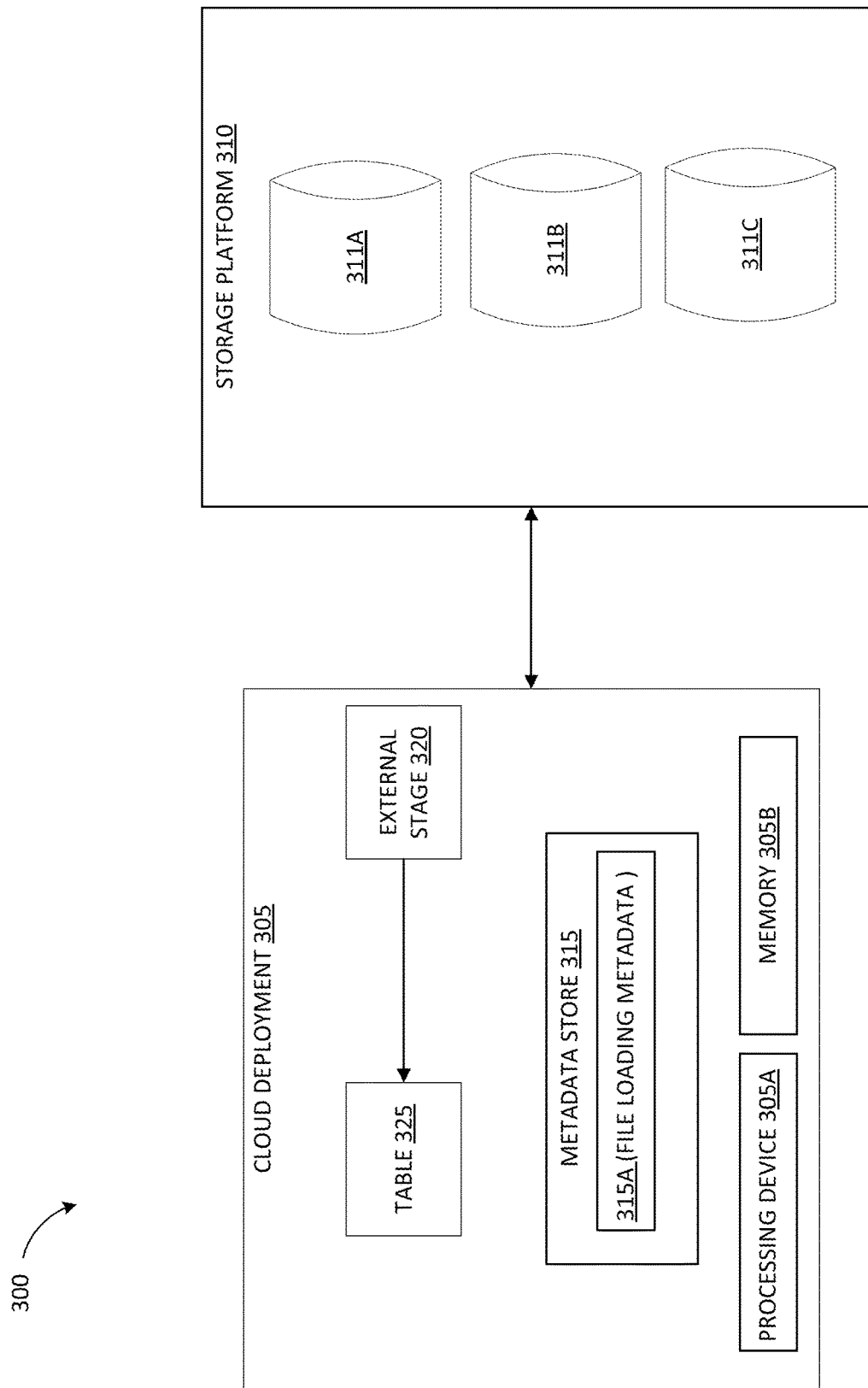
FIG. 3 is a schematic block diagram of a deployment of a data exchange, in accordance with some embodiments of the present disclosure.

FIG. 3 illustrates a cloud environment 300 which includes a storage platform 310 (similar to the cloud computing platform 110 illustrated in FIG. 1A) and a cloud deployment 305. The cloud deployment 305 may comprise a similar architecture to cloud computing service 112 (illustrated in FIG. 1A) and may be a deployment of a data exchange or data marketplace. Although illustrated with a single cloud deployment, the cloud environment 300 may have multiple cloud deployments which may be physically located in separate remote geographical regions but may all be deployments of a single data exchange or data marketplace. Although embodiments of the present disclosure are described with respect to a data exchange, this is for example purpose only and the embodiments of the present disclosure may be implemented in any appropriate enterprise database system or data sharing platform where data may be shared among users of the system/platform.

The cloud deployment 305 may include hardware such as processing device 305A (e.g., processors, central processing units (CPUs), memory 305B (e.g., random access memory (RAM), storage devices (e.g., hard-disk drive (HDD), solid-state drive (SSD), etc.), and other hardware devices (e.g., sound card, video card, etc.). A storage device may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. The cloud deployment 305 may comprise any suitable type of computing device or machine that has a programmable processor including, for example, server computers, desktop computers, laptop computers, tablet computers, smartphones, set-top boxes, etc. In some examples, the cloud deployment 305 may comprise a single machine or may include multiple interconnected machines (e.g., multiple servers configured in a cluster).

Databases and schemas may be used to organize data stored in the cloud deployment 305 and each database may belong to a single account within the cloud deployment 305. Each database may be thought of as a container having a classic folder hierarchy within it. Each database may be a logical grouping of schemas and a schema may be a logical grouping of database objects (tables, views, etc.). Each schema may belong to a single database. Together, a database and a schema may comprise a namespace. When performing any operations on objects within a database, the namespace is inferred from the current database and the schema that is in use for the session. If a database and schema are not in use for the session, the namespace must be explicitly specified when performing any operations on the objects.

The storage platform 310 may facilitate the storing of data and may comprise any appropriate object storage service such as e.g., the Amazon S3™ service to store data and query results. The storage platform 310 may comprise multiple buckets (databases) 311A-311C.

FIG. 3 also illustrates an example data ingestion process via which files are added to a stage and then loaded into cloud deployment 305. In the example of FIG. 3, cloud deployment 305 may include an external stage 320 which may specify an external location (e.g., S3 bucket) where data files to be ingested are stored so that the data in the files can be loaded into table 325. The external stage 320 may be an object that includes information pertaining to the storage of the files to be ingested, including the bucket (e.g., bucket 311A) where the files are stored, the named storage integration object or credentials for the bucket (if it is protected), and an encryption key (if the files in the bucket have been encrypted). A customer may reference (e.g., as part of an expression to copy data into table 325) the external stage 320 as the location (file path prefix) where the data is stored. For example, customers may write pipelines to copy data from external stage 320 into table 325 of the cloud deployment 305. In this way, the external stage 320 may allow customers to load tables from and export tables to buckets 311A-311C on storage platform 310. Although FIG. 3 illustrates an example using an external stage, any appropriate means of importing data may be used. For example, a customer may directly ingest files from the buckets 311A-311C, or the cloud deployment 305 may enable continuous loading of files as soon as the files available in a stage, rather than manually executing statements/expressions (e.g., a copy statement) on a schedule to load larger batches.

Because customers may ingest files in bursts (e.g., small batches of files at a time), the cloud deployment 305 may accumulate the small batches that the customer has been ingesting and periodically compact all of the small batches accumulated during a predefined time period into a combined file (this is referred to herein as the compaction phase of file ingestion). In this way, the cloud deployment 305 may obtain the list of files in the combined file using a single API call. The predefined time period during which the cloud deployment 305 will accumulate small batches of files before compacting them may be referred to as the compaction interval and may be any appropriate time period (e.g., a day, a week). The cloud deployment 305 may perform this compaction at the end of each compaction interval.

When the combined file is ingested, the cloud deployment 305 may generate file loading metadata including a list of files ingested. The file loading metadata may be used to prevent reloading the same files (and duplicating data) in a table. The file loading metadata may comprise the path (i.e. prefix) and name of each loaded file (e.g., 's3://bucket-name/<Random-UUID>.csv'), and may be used by the cloud deployment 305 for deduplication purposes including preventing loading of files with the same name even if they were later modified (e.g., have a different eTag) and performing file path-based minimum/maximum pruning (also referred to herein as minimum and maximum pruning). The file loading metadata may be stored in metadata store 315, which may be any appropriate metadata storage e.g., Foundation database (FDB). The metadata store 315 may include a number of data persistence objects (DPOs—not shown) in which data pertaining to the data exchange may be stored. For example, a base dictionary DPO (not shown) may comprise a set of database tables used to store information about the definition of a database of the cloud deployment 305 including information about database objects such as tables, indexes, columns, datatypes, and views. The metadata store 315 may also include an EP file DPO (not shown) in which the file loading metadata may be stored. More specifically, the file loading metadata may be stored in slice 315A of the EP file DPO.

Figure 4A:
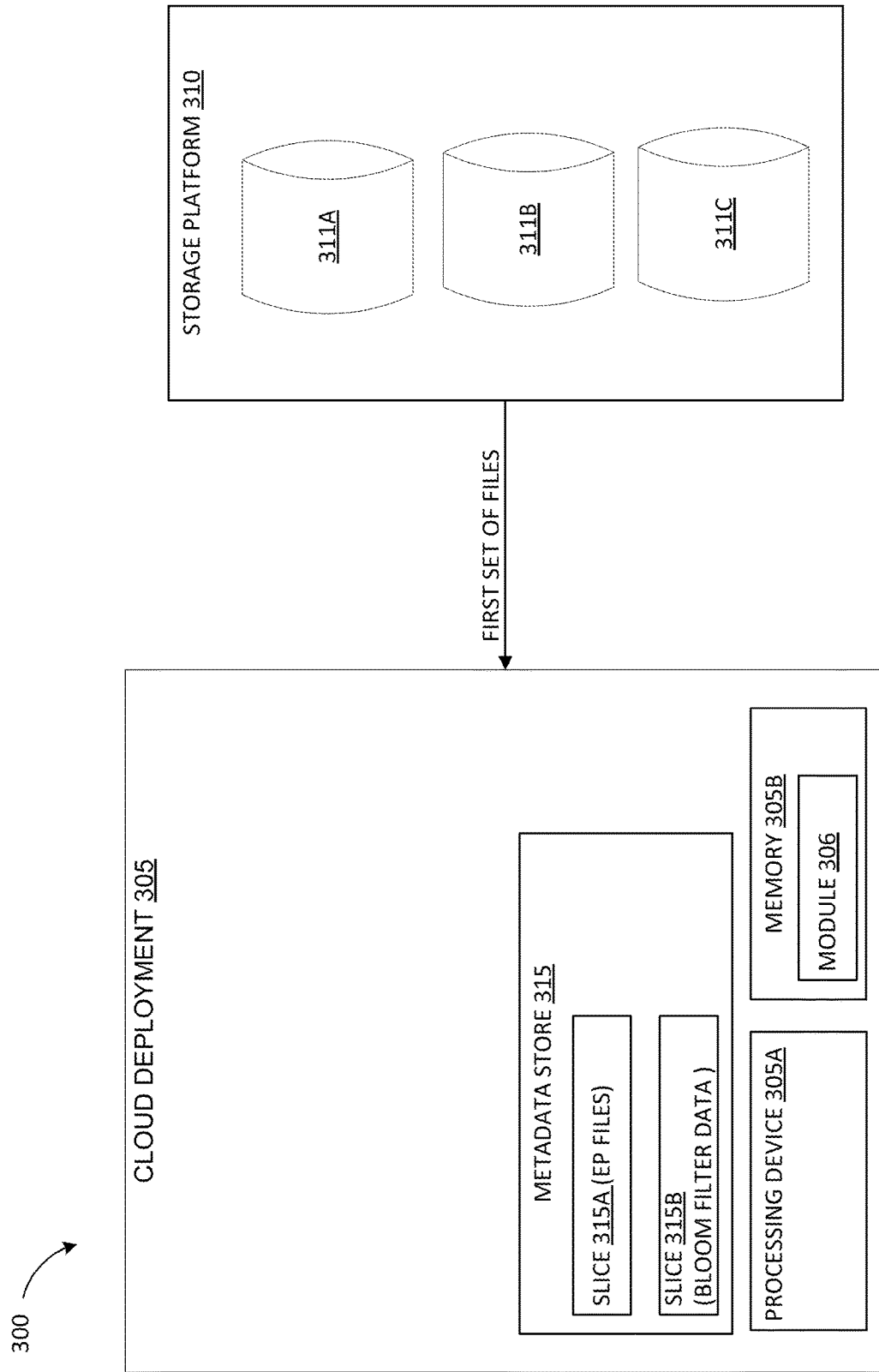
FIG. 4A is a schematic block diagram of a deployment of a data exchange that illustrates techniques for deduplicating files that are being ingested by the data exchange, in accordance with some embodiments of the present invention.

FIG. 4A illustrates the cloud deployment 305 ingesting a first set of files, in accordance with some embodiments of the present disclosure. The memory 305B may include a data deduplication module 306, which may be executed by processing device 305A in order to perform the functions described herein. It should be noted that although embodiments of the present disclosure are described with respect to data being ingested into a data exchange, this is for example purposes only and is not a limitation. The embodiments of the present disclosure may be utilized for deduplicating data that is being ingested into any appropriate storage and/or analysis platform such as cloud storage, a storage device (e.g., hard-disk drive (HDD), solid-state drive (SSD), etc.), or any other appropriate platform.

As discussed herein, the processing device 305A may continuously intake small batches of files. When the current compaction interval ends, the processing device 305A may initiate compaction of all of the small batches of files accumulated during the compaction interval (also referred to as the first set of files). During this compaction phase, the processing device 305A may generate and store the file loading metadata and use the file loading metadata to perform standard deduplication tasks such as minimum/maximum pruning (as discussed hereinabove) to generate a reduced set of files. For ease of description and illustration it will be assumed that all of the files in the first set of files are new (not duplicative) and are fully ingested.

Figure 5A:
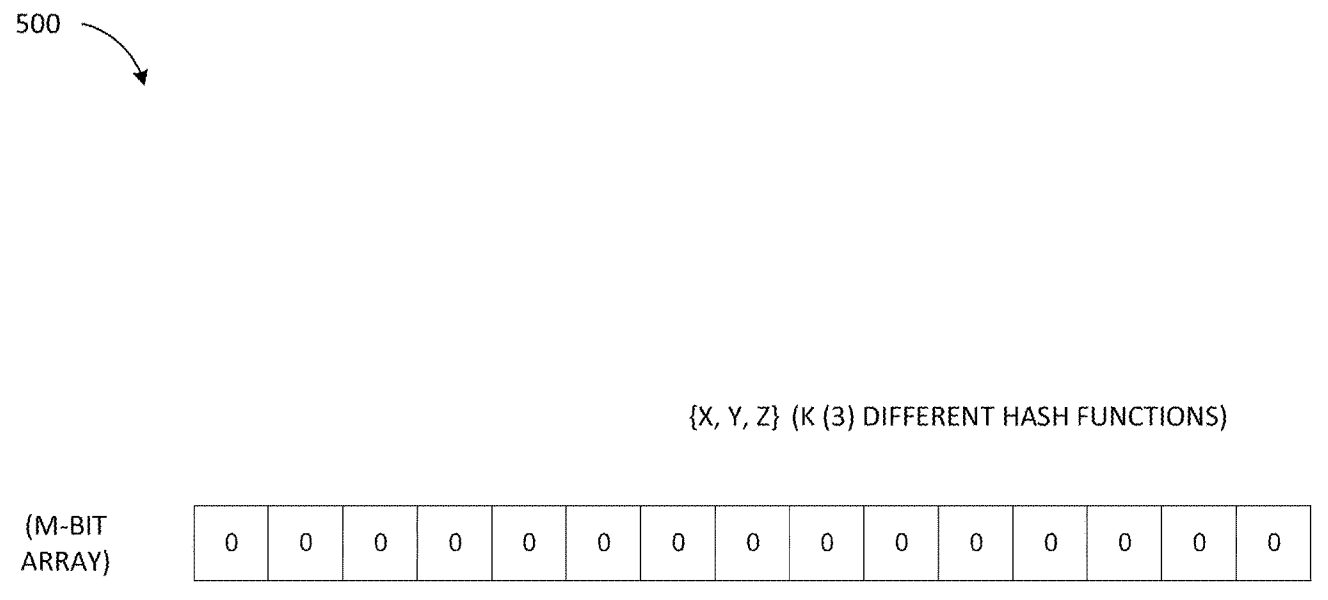
Figure 5B:
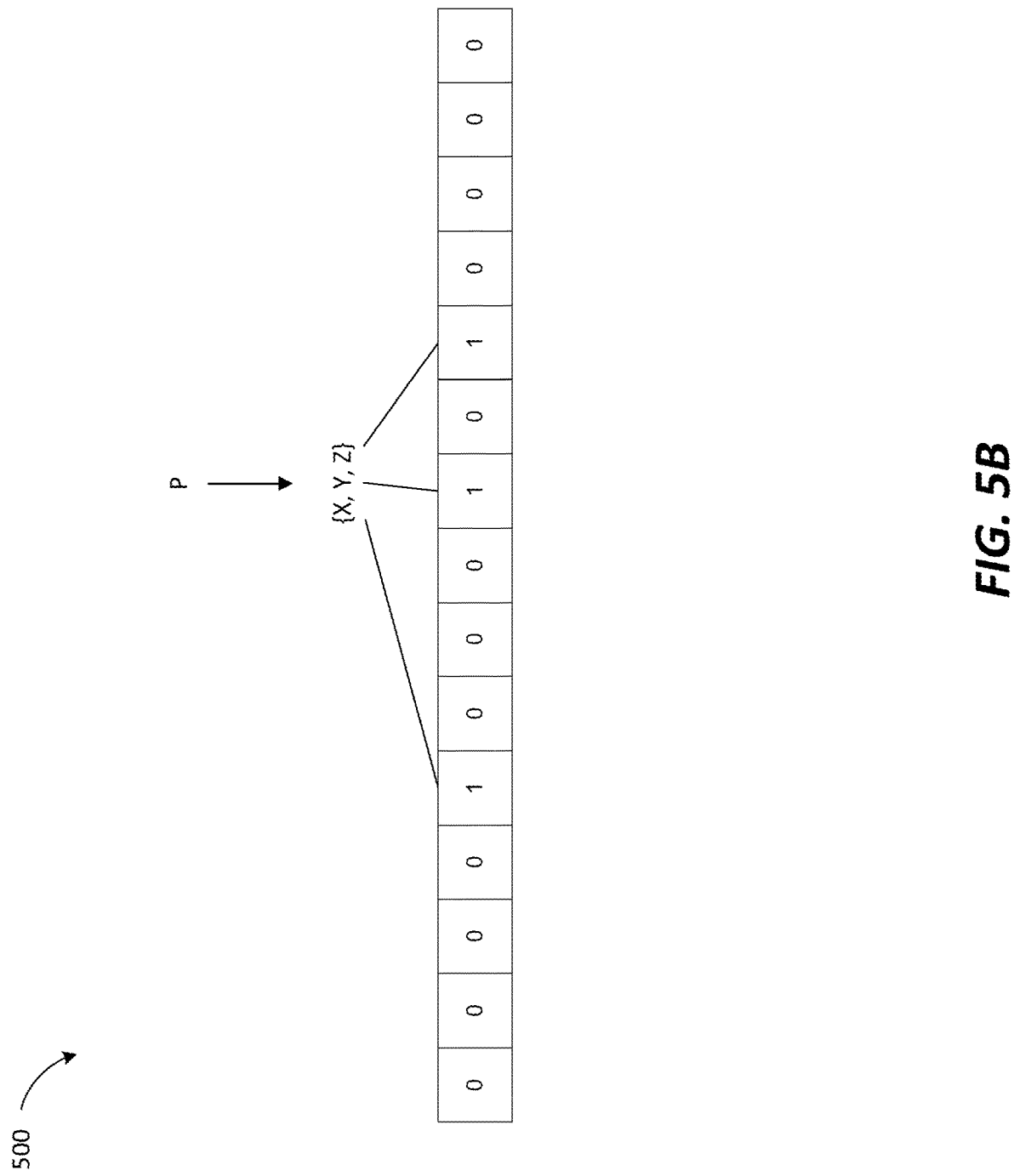

Upon ingesting the first set of files, the processing device 305A may build a bloom filter for each of the files in the first set of files. FIGS. 5A and 5B illustrate the process of generating a bloom filter 500 defined for a file P (e.g., one of the first set of files). The bloom filter 500 may be a bit array of m bits, all of which are initially set to 0 as shown in FIG. 5A. There may also be k different hash functions defined as part of the bloom filter 500 (shown as X, Y, and Z respectively in FIG. 5A), each of which maps or hashes the corresponding file (file P in the example of FIGS. 5A and 5B) to one of the m array positions (as discussed in further detail herein), thereby generating a uniform random distribution. Typically, k is a small constant which depends on the desired false positive rate (FPR), while m is proportional to k and the number of elements to be added. The processing device 305A may set k for each bloom filter based on desired performance metrics including false positivity rate (FPR) and processing time. For example, a bloom filter created with a larger number of hash functions may provide a lower FPR but may require longer processing time. Conversely, a bloom filter created with a smaller number of hash functions may provide a higher FPR but may require less processing time. As shown in FIG. 5A, the bloom filter 500 is defined with 15 bits, and 3 hash functions X, Y, and Z.

It should be noted that in scenarios where a current small batch of files is in the process of being ingested (i.e., has not been fully ingested) at the end of the compaction interval, the processing device 305A may refrain from creating bloom filters for the files of the current small batch of files, and instead may accumulate the current small batch of files along with small batches of files ingested during a subsequent compaction interval.

Referring now to FIG. 5B, the bloom filter 500 may hash the file P with each of the hash functions X, Y, and Z, such that each of the hash functions X, Y, and Z may generate an output between e.g., 0-1000. The processing device 305A may mark the position of the array corresponding to the output of each of the hash functions as 1. In the example of FIG. 5B, hash function X generates an output of 5 (thus the $5^{th}$ bit of the array is marked as 1), hash function Y generates an output of 9 (thus the $9^{th}$ bit of the array is marked as 1), and hash function Z generates an output of 11 (thus the $11^{th}$ bit of the array is marked as 1).

Referring back to FIG. 4A, the bloom filters generated for each of the first set of files may be collectively referred to (and shown in FIG. 4A) as bloom filter data. The processing device 305A may store the bloom filter data in a dedicated slice 315B of the metadata store 315. It is more advantageous from a computing and storage resources perspective to save the bloom filter data instead of recomputing it every time a small batch of files needs to be deduplicated. In addition, it is undesirable to store the bloom filter data along with the file loading metadata in slice 315A because a transition from previous deduplication models to the bloom filter-based deduplication model described herein should be seamless. In addition, it is desirable to be able to roll back to a previous deduplication model if an error occurs. Indeed, current deduplication techniques operate by fetching file metadata which has proven to be time consuming. Storing the bloom filter data separately in a metadata store allows for more performant reads and for downloading of the file metadata to be skipped if the bloom filter determines that duplicates are not present. Storing the bloom filter data along with file metadata may negate these benefits. Thus, the processing device 305A may add a new slice 315B to the metadata store 315 (within the EP file DPO). The processing device 305A may then serialize and store the bloom filter data in the slice 315B. The slice 315B may have the same keys as slice 315A while the values will correspond to the serialized bloom filter for each of the files in the first set of files. For example, the keys of the slice 315B may include e.g., ACCOUNT ID, TABLE ID, FILE VERSION, ID etc., while the values of the slice 315B may include the bloom filter for each of the files in the first set of files.

The processing device 305A may read the bloom filter data more quickly than it would file loading metadata, and the volume of data is smaller and may be more efficiently cached. In some examples, a cache size similar to the cache size used to cache file loading metadata may hold bloom filter data for 20 times the amount of files. This reduces the memory and network overhead during deduplication and also allows a larger number of files to be cached. In one example, assuming there are approximately 22 million files being ingested and that a bloom filter is to be generated for each one of them, and taking the average size of the bloom filter to be e.g., 2400 bytes, the size of slice 315B will be approximately 53 GB. Because the logic of the deduplication module 306 is run on multiple virtual warehouse instances, this 53 GB can be efficiently cached across all of those virtual warehouse instances. It should be noted that approximately 53 GB of bloom filter data corresponds to multiple terabytes of file loading metadata, which is essentially uncacheable.

Figure 4B:
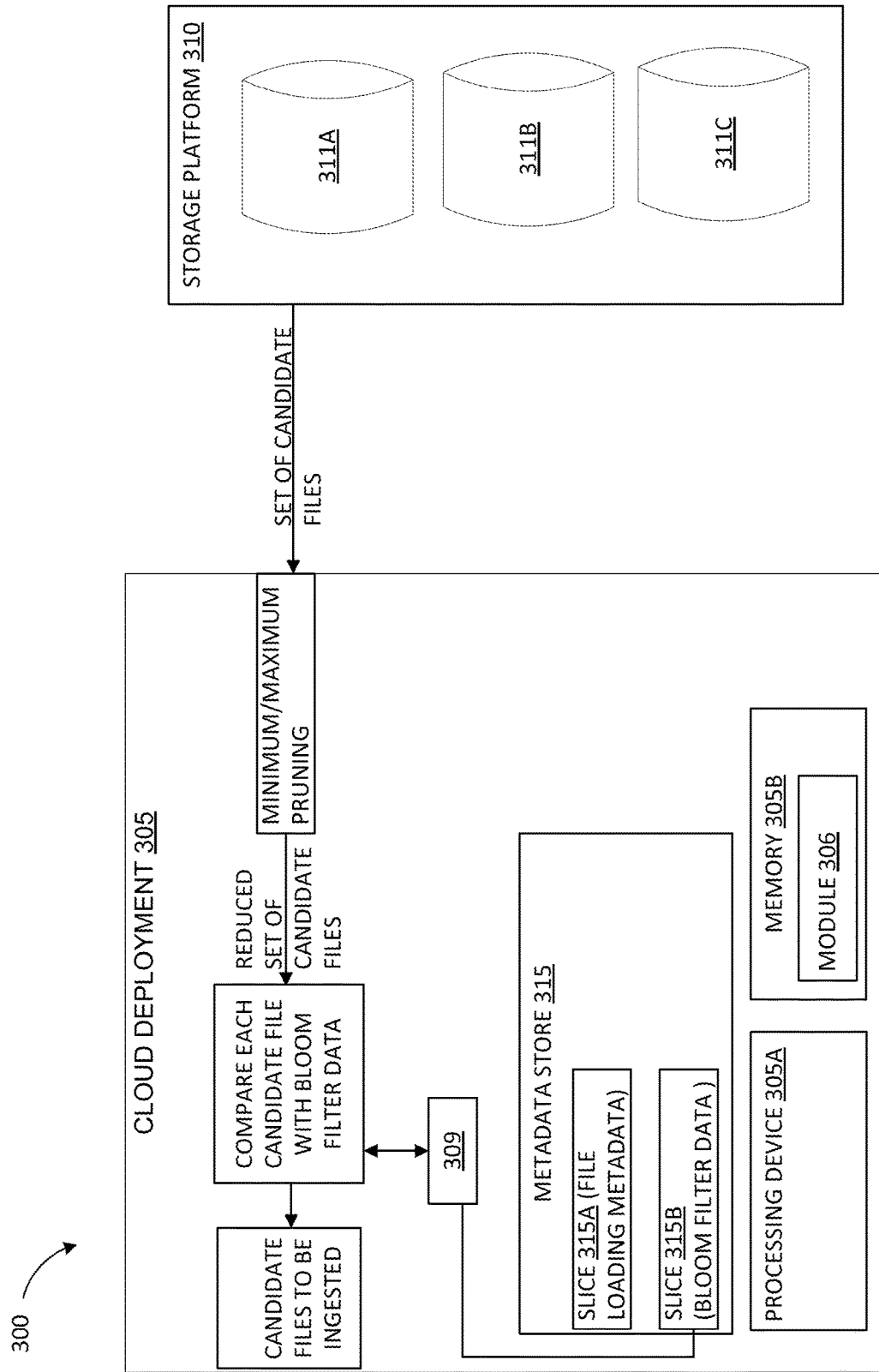
FIG. 4B is a schematic block diagram of a deployment of a data exchange that illustrates techniques for deduplicating files that are being ingested by the data exchange, in accordance with some embodiments of the present invention.

Referring now to FIG. 4B, a new compaction interval may begin and the processing device 305A may begin to ingest batches of files (referred to as candidate files). At the end of the compaction interval, the processing device 305A (executing module 306) may begin the compaction phase. During the compaction phase, the processing device 305A may generate and store the file loading metadata and commence the standard minimum/maximum pruning operation to generate a reduced set of candidate files.

During deduplication and after the minimum/maximum pruning operation, for each of the reduced set of candidate files, the processing device 305A may retrieve the bloom filter for each of the first set of files from the slice 315B of the metadata store 315, and query each of the bloom filters to see if the data of the candidate file is duplicative of the data within any of the first set of files. More specifically, the processing device 305A may retrieve (lookup) from the metadata store 315, deserialize, and cache the bloom filter generated for each of the first set of files. In some embodiments, the processing device 305A may use point lookups when retrieving the bloom filters for the first set of files from the metadata store 315. Indeed, the metadata store 315 may provide optimal performance when it is queried for values that correspond to a specified key that is of interest, (i.e., a point lookup). The performance of the metadata store 315 may be limited if the processing device 305A simply requests all values from a certain range/set of keys (i.e., a scan).

The processing device 305A may cache the retrieved bloom filters in a dedicated cache 309. For example, a cache of size 0.5 GB should be able to hold bloom filters for approximately 800 million files.

Because the processing device 305A may perform point lookups for each of the reduced set of files, for unclustered file paths, existing minimum/maximum-based pruning strategies require the processing device 305A to look up all of the files that belong to the table 325, whereas for well clustered file paths, this number should be close to zero. This is because when the customer's file paths are randomly distributed (unclustered) then existing minimum/maximum-based pruning strategies are inefficient and will result in a search of all the files ingested by the table 325.

Referring to FIG. 5C, when the processing device 305A queries the bloom filter 500 to see if a particular candidate file Q is duplicative of the file P that the bloom filter 500 corresponds to (i.e., contains data that is duplicative of the data within the file P), the bloom filter 500 may perform the 3 hash functions X, Y, and Z on the candidate file Q. If the output of all 3 hash operations each correspond to a bit of the array that has been marked with a 1, the processing device 305A may determine that the data of the candidate file Q is potentially within the file P. If the output of any of the hash functions X, Y, and Z corresponds to a bit of the array that has not been marked with a 1, the processing device 305A may determine that the data of the candidate file Q is definitely is not duplicative of the data in the file P. As shown in the example of FIG. 5C, the hash function Y has generated an output that corresponds to the $8^{th}$ bit of the array, marked with 0. Thus, the processing device 305A may determine that the candidate file Q is not duplicative of the file P, and proceed to compare the candidate file Q to the bloom filter of the next file among the first set of files.

In this way, for each candidate file of the reduced set of candidate files (the files to be deduplicated), the processing device 305A may process that candidate file with the bloom filter of each of the first set of files, and determine whether the candidate file is located within any of the first set of files (i.e., contains data that is duplicative of the data within any of the first set of files). Each candidate file that is new (i.e., does not contain data that is duplicative of the data in any of the first set of files) may be grouped together by the processing device 305A to create a further reduced set of candidate files that is to be loaded and completely scanned (i.e., ingested). The processing device 305A may also build and store a bloom filter for each of the further reduced set of candidate files.

In some embodiments, the processing device 305A may prune each candidate file that is determined to potentially have duplicative data. In other embodiments, for each of the candidate files that the processing device 305A determines is potentially duplicative, the processing device 305A may perform a second check by downloading the history of ingested files from the storage platform 310 and determining if the candidate file exists in the history of ingested files. If the processing device 305A determines that the candidate file is not within the history of ingested files, it may determine that the candidate file needs to be ingested. If the candidate file is located within the history of ingested files, it may determine that the candidate file is a duplicate and prune it.

FIG. 6 is a flow diagram of a method 600 for deduplicating, in accordance with some embodiments of the present disclosure. Method 600 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 600 may be performed by processing device 305A of cloud deployment 305 (illustrated in FIGS. 4A and 4B).

Referring simultaneously to FIGS. 4A and 4B, the deployment 305 may continuously intake small batches of files. When the current compaction interval ends, the processing device 305A may initiate compaction of all of the small batches of files accumulated during the compaction interval (also referred to as a first set of files). During this compaction phase, the processing device 305A may generate and store the file loading metadata and use the file loading metadata to perform the standard deduplication tasks such as minimum/maximum pruning (as discussed hereinabove) to generate a reduced set of files. For ease of description and illustration it will be assumed that all of the files in the first set of files are new (not duplicative) and are fully ingested. At block 605, upon ingesting the first set of files, the processing device 305A may build a bloom filter for each of the files in the first set of files.

The bloom filters generated for each of the first set of files may be collectively referred to (and shown in FIG. 4A) as bloom filter data. At block 610, the processing device 305A may store the bloom filter data in a dedicated slice 315B of the EP file DPO. It is more advantageous from a computing and storage resources perspective to save the bloom filter data instead of recomputing it every time a small batch of files needs to be deduplicated. In addition, it is undesirable to store the bloom filter data along with the file loading metadata in slice 315A because when a transition occurs the transition should be seamless. In addition, it is desirable to be able to roll back if something goes wrong. Thus, the processing device 305A may add a new slice 315B to the EP file DPO. The processing device 305A may then serialize and store the bloom filter data in the slice 315B. The slice 315B may have the same keys as slice 315A while the values will correspond to the serialized bloom filter for each of the files in the first set of files. For example, the keys of the slice 315B may include e.g., ACCOUNT ID, TABLE ID, EP FILE VERSION, ID etc., while the values of the slice 315B may include the bloom filter data for each of the files in the first set of files.

A new compaction interval may begin and the processing device 305A may begin to ingest small batches of files. At the end of the compaction interval, the processing device 305A (executing module 306) may begin the compaction phase. During the compaction phase, the processing device 305A may generate and store the file loading metadata and at block 615, may commence the standard minimum/maximum pruning operation to generate a reduced set of candidate files.

During deduplication and after the minimum/maximum pruning operation, for each of the reduced set of files (referred to as candidate files), the processing device 305A may retrieve the bloom filter for each of the first set of files from the slice 315B of the metadata store 315, and at block 620 may query each of the bloom filters to see if the data of the candidate file is duplicative of the data within any of the first set of files. More specifically, the processing device 305A may retrieve (lookup) from the metadata store 315, deserialize, and cache the bloom filter generated for each of the first set of files. The processing device 305A may cache the retrieved bloom filters in a dedicated cache 309. For example, a cache of size 0.5 GB should be able to hold bloom filters for ~800 million files. In some embodiments, the processing device 305A may use point lookups when retrieving the bloom filters for the first set of files from the metadata store 315. Indeed, the metadata store 315 may provide optimal performance when it is queried for values that correspond to a specified key that is of interest, (i.e., a point lookup). The performance of the metadata store 315 may be limited if the processing device 305A simply requests all values from a certain range/set of keys (i.e., a scan).

In this way, for each candidate file of the reduced set of files (the files to be deduplicated), the processing device 305A may run the bloom filter of each of the first set of files against that candidate file, and determine whether the candidate file is located within any of the first set of files (i.e., contains data that is duplicative of the data within any of the first set of files). Each candidate file that is new (i.e., does not contain data that is duplicative of the data in any of the first set of files) may be grouped together by the processing device 305A to create a further reduced set of files that is to be downloaded and completely scanned (i.e., completely ingested). The processing device 305A may also build and store a bloom filter for each of the scanned and loaded files of the further reduced set of files. The processing device 305A may prune each candidate file that is determined to potentially have duplicative data.

In some embodiments, for each of the candidate files that the processing device 305A determines is potentially duplicative, the processing device 305A may download the history from cloud provider storage and perform a second check to determine if the candidate file needs to be ingested.

Figure 7:
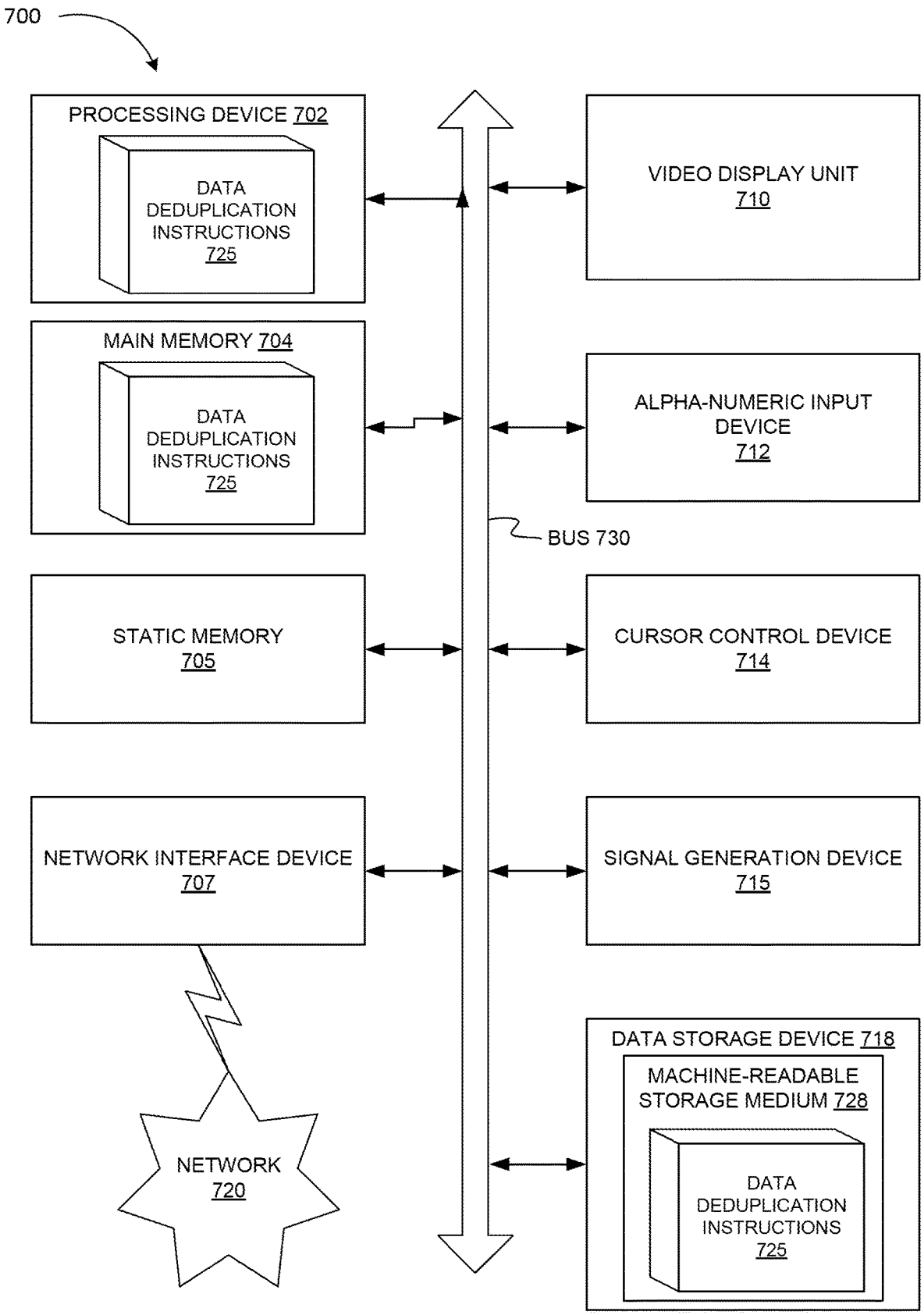
FIG. 7 is a block diagram of an example computing device that may perform one or more of the operations described herein, in accordance with some embodiments of the present invention.

FIG. 7 illustrates a diagrammatic representation of a machine in the example form of a computer system 700 within which a set of instructions, for causing the machine to perform any one or more of the methodologies discussed herein for deduplicating files to be ingested by a data exchange.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of a server.

The exemplary computer system 700 includes a processing device 702, a main memory 704 (e.g., read-only memory (ROM), flash memory, dynamic random access memory (DRAM), a static memory 705 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computing device 700 may further include a network interface device 707 which may communicate with a network 720. The computing device 700 also may include a video display unit 710 (e.g., a liquid crystal display (LCD) or a cathode ray tube (CRT)), an alpha-numeric input device 712 (e.g., a keyboard), a cursor control device 714 (e.g., a mouse) and an acoustic signal generation device 715 (e.g., a speaker). In one embodiment, video display unit 710, alphanumeric input device 712, and cursor control device 714 may be combined into a single component or device (e.g., an LCD touch screen).

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute data deduplication instructions 725, for performing the operations and steps discussed herein.

The data storage device 718 may include a machine-readable storage medium 728, on which is stored one or more sets of data deduplication instructions 725 (e.g., software) embodying any one or more of the methodologies of functions described herein. The data deduplication instructions 725 may also reside, completely or at least partially, within the main memory 704 or within the processing device 702 during execution thereof by the computer system 700; the main memory 704 and the processing device 702 also constituting machine-readable storage media. The data deduplication instructions 725 may further be transmitted or received over a network 720 via the network interface device 707.

The machine-readable storage medium 728 may also be used to store instructions to perform the methods described herein. While the machine-readable storage medium 728 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "receiving," "routing," "granting," "determining," "publishing," "providing," "designating," "encoding," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned (including via virtualization) and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams or flow diagrams, and combinations of blocks in the block diagrams or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
    building a bloom filter for each of a first set of files to be ingested into a data exchange to generate a set of bloom filters, wherein each of the set of bloom filters is built with an array of bits and a number of hash functions that is based on a desired false positive rate;
    storing the set of bloom filters in a metadata storage of the data exchange; and
    in response to receiving a set of candidate files to be ingested into the data exchange:
        pruning the set of candidate files using file loading metadata generated based on the first set of files and file loading metadata generated based on the set of candidate files to generate a reduced set of candidate files;
        identifying using the set of bloom filters, candidate files from the reduced set of candidate files that are duplicative of a file in the first set of files; and
        pruning, by a processing device, from the reduced set of candidate files, each candidate file identified as being duplicative of a file in the first set of files using the set of bloom filters; and
        grouping each remaining candidate file of the reduced set of candidate files together for ingestion into the data exchange.

2. The method of claim 1, wherein pruning the set of candidate files using the file loading metadata generated based on the first set of files and the file loading metadata generated based on the set of candidate files comprises:

identifying using the file loading metadata generated based on the first set of files and the file loading metadata generated based on the set of candidate files, one or more candidate files from the set of candidate files that are duplicative of a file in the first set of files; and pruning from the set of candidate files, each of the one or more candidate files identified as being duplicative of a file in the first set of files using the file loading metadata generated based on the first set of files and the file loading metadata generated based on the set of candidate files.

3. The method of claim 1, wherein identifying using the set of bloom filters, candidate files from the reduced set of candidate files that are duplicative of a file in the first set of files comprises:

for each candidate file of the reduced set of candidate files, processing the candidate file with each of the set of bloom filters to determine whether the candidate file is new or duplicative of any of the first set of files.

4. The method of claim 1, wherein storing the set of bloom filters in the metadata storage comprises:

serializing the set of bloom filters; and storing the serialized set of bloom filters in a slice of the metadata storage dedicated to the set of bloom filters.

5. The method of claim 1, further comprising:

retrieving each of the set of bloom filters from the metadata store;

deserializing each of the set of bloom filters; and caching each of the set of bloom filters in a cache dedicated to the set of bloom filters.

6. The method of claim 5, wherein each of the set of bloom filters is retrieved using a point lookup.

7. The method of claim 2, wherein identifying the one or more candidate files that are duplicative of a file in the first set of files comprises:

using a minimum and maximum pruning technique to identify the one or more candidate files that are duplicative of a file in the first set of files based on the file loading metadata generated based on the first set of files and the file loading metadata generated based on the set of candidate files.

8. A system comprising:

a memory; and a processing device operatively coupled to the memory, the processing device to:

build a bloom filter for each of a first set of files to be ingested into a data exchange to generate a set of bloom filters, wherein each of the set of bloom filters is built with an array of bits and a number of hash functions that is based on a desired false positive rate;

store the set of bloom filters in a metadata storage of the data exchange; and in response to receiving a set of candidate files to be ingested into the data exchange:

prune the set of candidate files using file loading metadata generated based on the first set of files and file loading metadata generated based on the set of candidate files to generate a reduced set of candidate files;

identify using the set of bloom filters, candidate files from the reduced set of candidate files that are duplicative of a file in the first set of files; and prune from the reduced set of candidate files, each candidate file identified as being duplicative of a file in the first set of files using the set of bloom filters; and grouping each remaining candidate file of the reduced set of candidate files together for ingestion into the data exchange.

9. The system of claim 8, wherein to prune the set of candidate files using the file loading metadata generated based on the first set of files and the file loading metadata generated based on the set of candidate files, the processing device is to:

identify using the file loading metadata generated based on the first set of files and the file loading metadata generated based on the set of candidate files, one or more candidate files from the set of candidate files that are duplicative of a file in the first set of files; and prune from the set of candidate files, each of the one or more candidate files identified as being duplicative of a file in the first set of files using the file loading metadata generated based on the first set of files and the file loading metadata generated based on the set of candidate files.

10. The system of claim 8, wherein to identify from the reduced set of candidate files, each candidate file that is duplicative of a file in the first set of files using the set of bloom filters, the processing device is to:

for each candidate file of the reduced set of candidate files, process the candidate file with each of the set of bloom filters to determine whether the candidate file is new or duplicative of any of the first set of files.

11. The system of claim 8, wherein to store the set of bloom filters in the metadata storage, the processing device is to:

serialize the set of bloom filters; and store the serialized set of bloom filters in a slice of the metadata storage dedicated to the set of bloom filters.

12. The system of claim 8, wherein the processing device is further to:

retrieve each of the set of bloom filters from the metadata store;

deserialize each of the set of bloom filters; and cache each of the set of bloom filters in a cache dedicated to the set of bloom filters.

13. The system of claim 12, wherein the processing device retrieves each of the set of bloom filters using a point lookup.

14. The system of claim 9, wherein to identify the one or more candidate files that are duplicative of a file in the first set of files, the processing device is to:

use a minimum and maximum pruning technique to identify the one or more candidate files that are duplicative of a file in the first set of files based on the file loading metadata generated based on the first set of files and the file loading metadata generated based on the set of candidate files.

15. A non-transitory computer-readable medium having instructions stored thereon which, when executed by a processing device, cause the processing device to:

build a bloom filter for each of a first set of files to be ingested into a data exchange to generate a set of bloom filters, wherein each of the set of bloom filters is built with an array of bits and a number of hash functions that is based on a desired false positive rate;

store the set of bloom filters in a metadata storage of the data exchange; and in response to receiving a set of candidate files to be ingested into the data exchange:

prune the set of candidate files using file loading metadata generated based on the first set of files and file loading metadata generated based on the set of candidate files to generate a reduced set of candidate files;

identify using the set of bloom filters, candidate files from the reduced set of candidate files that are duplicative of a file in the first set of files; and prune, by the processing device, from the reduced set of candidate files, each candidate file identified as being duplicative of a file in the first set of files using the set of bloom filters; and grouping each remaining candidate file of the reduced set of candidate files together for ingestion into the data exchange.

16. The non-transitory computer-readable medium of claim 15, wherein to prune the set of candidate files using the file loading metadata generated based on the first set of files and the file loading metadata generated based on the set of candidate files, the processing device is to:

identify using the file loading metadata generated based on the first set of files and the file loading metadata generated based on the set of candidate files, one or more candidate files from the set of candidate files that are duplicative of a file in the first set of files; and prune from the set of candidate files, each of the one or more candidate files identified as being duplicative of a file in the first set of files using the file loading metadata generated based on the first set of files and the file loading metadata generated based on the set of candidate files.

17. The non-transitory computer-readable medium of claim 15, wherein to identify from the reduced set of candidate files, each candidate file that is duplicative of a file in the first set of files using the set of bloom filters, the processing device is to:

for each candidate file of the reduced set of candidate files, process the candidate file with each of the set of bloom filters to determine whether the candidate file is new or duplicative of any of the first set of files.

18. The non-transitory computer-readable medium of claim 15, wherein to store the set of bloom filters in the metadata storage, the processing device is to:

serialize the set of bloom filters; and store the serialized set of bloom filters in a slice of the metadata storage dedicated to the set of bloom filters.

19. The non-transitory computer-readable medium of claim 15, wherein the processing device is further to:

retrieve each of the set of bloom filters from the metadata store;

deserialize each of the set of bloom filters; and cache each of the set of bloom filters in a cache dedicated to the set of bloom filters.

20. The non-transitory computer-readable medium of claim 19, wherein the processing device retrieves each of the set of bloom filters using a point lookup.

21. The non-transitory computer-readable medium of claim 16, wherein to identify the one or more candidate files that are duplicative of a file in the first set of files, the processing device is to:

use a minimum and maximum pruning technique to identify the one or more candidate files that are duplicative of a file in the first set of files based on the file loading metadata generated based on the first set of files and the file loading metadata generated based on the set of candidate files.

* * * * *